Patented June 10, 1930

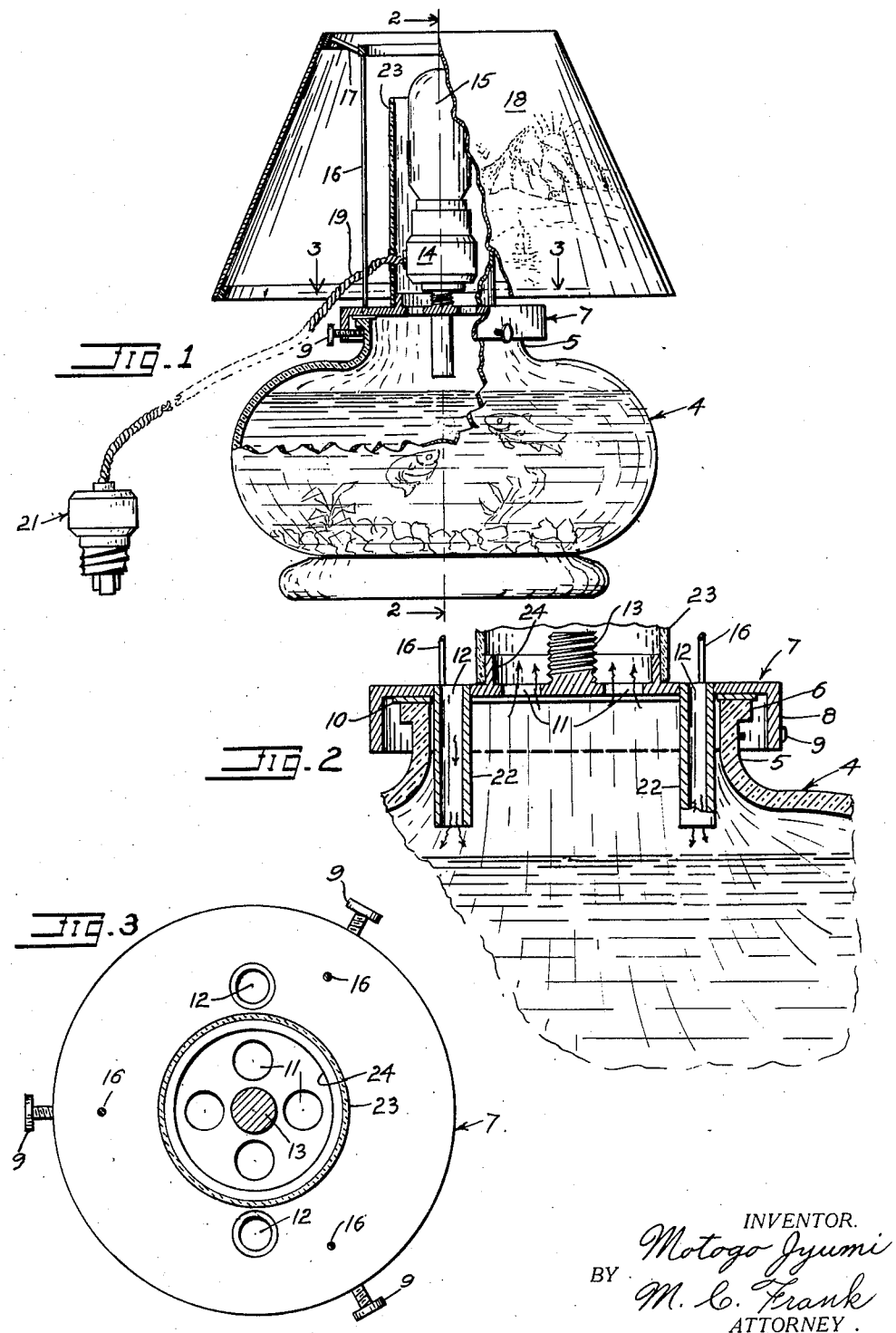

1,762,634

UNITED STATES PATENT OFFICE

MOTOGO JYUMI, OF OAKLAND, CALIFORNIA

FISH BOWL AND LAMP COMBINATION

Application filed January 3, 1929. Serial No. 330,057.

The invention relates to an ornamental article comprising a fish bowl and lamp in unitary association.

An object of the invention is to provide means for insuring a convection circulation of air through a fish bowl or the like.

Another object of the invention is to provide means utilizing the lamp of the combination for effecting an increased circulation of air through the fish bowl when the lamp is lit.

A further object of the invention is to provide an improved means for mounting a lamp on a fish bowl of usual shape.

Yet another object of the invention is to provide an improved lamp and shade combination for mounting on a fish bowl and the like.

The invention possesses other objects and features of advantage, some of which, with the foregoing, will be set forth in the following description of a preferred form of the invention which is illustrated in the accompanying drawings, in which, Figure 1 is a side view showing a combination fish bowl and lamp unit embodying the invention, a portion of the structure being shown in sectional elevation.

Figure 2 is an enlarged fragmentary sectional view taken on the line 2—2 in Figure 1.

Figure 3 is an enlarged plan view of a lamp base of the structure as viewed on the line 3—3 in Figure 1.

As particularly illustrated, the device of my invention is applied to a fish bowl 4 of a usual shape and having a tubular neck portion 5 terminating in a radially thickened rim 6. A closure member 7 is provided for the bowl, said member being generally disc-shaped for a supported disposal on and over the rim 6. A flange 8 depends from the edge of the closure member in radially spaced relation to the bowl rim and to a point somewhat below the rim, and screws 9 are provided in said flange for engagement with the bowl neck 5 below the rim. A resilient gasket 10 is preferably installed between the rim and member 7, as shown. In this manner, the closure member is arranged for a sealed and removable mounting on bowls having rims of different sizes. The member 7 is provided with inner and outer sets of openings 11 and 12 respectively, said openings being provided for constantly venting the space within the bowl.

Extending axially upwardly from the member 7 is a threaded boss 13 providing a mounting for a suitable source of illumination. As shown, an electric lamp socket 14 is mounted on the boss 13, said socket containing a lamp 15 disposed in upright position. The member 7 is thus seen to function as a supporting base for the lamp. Also extending upwardly from the member 7 are rods 16, said rods supporting a lamp shade frame 17 on which is mounted a shade 18 of suitable size and design. The necessary wires 19 for supplying current to the lamp 15 are directed through the side of the socket 14 and are provided at their free end with a suitable attachment plug 21. In this manner, a pleasing unitary combination of a lamp, lamp shade and fish bowl is effected in a particularly simple and effective manner.

When the lamp 15 is unlit, the air circulation through the openings 11 and 12 of the closure member 7 is generally sufficient to provide the necessary supply of fresh air to the bowl 4. To insure a maximum movement of circulated air in the bowl, under these conditions, tubes 22 are mounted on the member 7 to extend downwardly from the outer set of openings 12 thereof toward the surface of the water in the bowl. In this manner, warmer air rising to and escaping through the inner set of openings 11 will cause an inward flow of fresh air through the tubes 22 for discharge near the water surface, thus insuring some circulation of fresh air at and along the water surface at all times whereby the fish may obtain the same by rising to the surface as they must do in quiet waters generally.

When the lamp 15 is lit, some of the heat generated thereby will be radiated, both directly and by reflection from within the shade 18, toward the bowl and its contents, and the resulting heating thus produced may proceed faster than the cooling by the convection circulation previously described, even though the latter increases its quantity flow rate on account of said radiated heat. Accordingly, it is highly desirable that the effect of said radiated heat be overcome in a positive manner, and in the present instance the desired result is obtained by suitably increasing the aforesaid convection circulation through the bowl by utilizing the heat of the lamp, said lamp functioning essentially as a heat source for this specific purpose. In this manner, the exposed water surface is constantly cooled by evaporation induced thereat by the circulated air.

To utilize to the fullest extent the heat of the lamp for producing the desired increased convection circulation of air through the bowl, I dispose about the lamp in upright position, a tubular chimney member 23 whereby a definite up-draft is created along the lamp and through the openings 11, the latter openings lying within the base of the member 23. The chimney member 23 is formed of a transparent or at least translucent material which may be a heat resistant glass, mica, or other suitable composition. As shown, the base member is provided with an upwardly extending annular flange 24 for engagement with the base of the member 23 to hold the latter in coaxial relation to the lamp 15. The wires 19 are preferably led from the space within the member 23 through a suitable perforation therein.

It will now be noted that the unitary member 7 hereinbefore described functions in itself both as a circulation control device and as a lamp base, whereby it may be installed on usual types of fish or aquarium bowls purely as an attachment therefor, and without requiring any special adaptation of the bowl for use therewith. In the event, however, that the device is to be used with a bowl which itself is provided with ventilating openings, it will be obvious that the openings 12 and tubes 22 might be omitted from the present structure of the base member 7 without departing from the spirit of the invention, since an identical operation would result. The latter type of bowl, it is noted, is shown and described in my copending application for United States Letters Patent for an aerated vessel and closure therefor, Serial No. 309,922, filed October 3, 1928.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In combination with an equarium, a lamp base disposable as a closure for the aquarium, a lamp mounted on said base, means providing open air passages for the aquarium, and means utilizing said lamp for effecting a convection circulation of air through said passages and aquarium.

2. In combination with an aquarium, a closure member therefor mounted on the aquarium, means providing open air passages for the aquarium, a source of heat mounted on said member, and means utilizing said source of heat for effecting a circulation of air through said passages and aquarium.

3. In combination with an aquarium, a closure member therefor, means providing open air passages for the aquarium, a source of heat mounted on said member, and an upright tubular member enclosing said source of heat and communicating with less than all of said passages.

4. In combination with a fish bowl, a lamp base disposable as a closure for the bowl, means providing open air passages for the vessel, a lamp mounted on said member, and an upright tubular member enclosing said lamp, said member being open at the top and communicating at the bottom with less than all of said passages.

5. In combination with a fish bowl having a circular rim at its mouth, a disc-shaped member disposable on and over said rim as a closure for the mouth and providing a plurality of vent openings, means on the member for securing it to the said rim, a boss extending axially upwardly from said member, an electric lamp mounted on said boss with its axis vertical, a shade frame extending upwardly from said member, and a shade on said frame.

In testimony whereof, I affix my signature.

MOTOGO JYUMI.